US012619494B2

(12) United States Patent
Yun

(10) Patent No.: US 12,619,494 B2
(45) Date of Patent: May 5, 2026

(54) STORAGE DEVICE AND OPERATING METHOD THEREOF

(71) Applicant: SK hynix Inc., Gyeonggi-do (KR)

(72) Inventor: Jang Hun Yun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 18/414,475

(22) Filed: Jan. 17, 2024

(65) Prior Publication Data

US 2025/0013531 A1    Jan. 9, 2025

(30) Foreign Application Priority Data

Jul. 5, 2023    (KR) ......................... 10-2023-0087126

(51) Int. Cl.
G06F 11/10        (2006.01)
G06F 11/07        (2006.01)
G06F 11/30        (2006.01)

(52) U.S. Cl.
CPC ........ G06F 11/1068 (2013.01); G06F 11/076 (2013.01); G06F 11/3058 (2013.01)

(58) Field of Classification Search
None
See application file for complete search history.

(56) References Cited

U.S. PATENT DOCUMENTS 11,210,031 B1 *  12/2021  Mekhanik ............. G06F 3/0679
2019/0146687 A1 *   5/2019  Chien ..................... G11C 7/04
                                                   711/103

2020/0348887 A1 *  11/2020  Kim ...................... G06F 3/0659
2020/0394114 A1 *  12/2020  Lee ...................... G06F 12/0882
2024/0069784 A1 *   2/2024  Basso ................. G06F 11/3037

FOREIGN PATENT DOCUMENTS

KR    10-2015-0121562  A    10/2015
KR    10-2018-0026993  A    3/2018

OTHER PUBLICATIONS

T. Kouchi et al., "A 128Gb 1-bit/Cell 96-Word-Line-Layer 3D Flash Memory to Improve the Random Read Latency With tProg=75 μs and tR =4 μs," in IEEE Journal of Solid-State Circuits, vol. 56, No. 1, pp. 225-234, Jan. 2021, (Year: 2010).*

* cited by examiner

*Primary Examiner* — Daniel F. McMahon
(74) *Attorney, Agent, or Firm* — IP & T GROUP LLP

(57) ABSTRACT

A storage device includes a memory device and a memory controller. The memory device includes a first region including a memory block storing n bit(s) per memory cell, where n is a natural number of 1 or more, and a second region including a memory block storing m bits per memory cell, where m is a natural number greater than n. The memory controller sets an operation mode of a background media scan to one of a normal mode in which a temperature of the memory device is within a set range and an abnormal mode in which the temperature of the memory device is out of the set range, and perform the background media scan on at least one of the first region and the second region based on operation condition information of the background media scan, which respectively correspond to normal mode and abnormal mode.

14 Claims, 5 Drawing Sheets

Background Media Scan

| BLK | Error Bits |
|------|------------|
| BLK1 | 5 |
| BLK2 | 10 |
| BLK3 | 30 |
| BLK4 | 20 |

Error
Threshold=15

Copy → Free BLK

Copy → Free BLK

BGMS_OP1

| Operation Mode | Normal Mode | Abnormal Mode |
|----------------|-------------|---------------|
| Target Region | First Region, Second Region | First Region |

BGMS_OP2

| Operation Mode | Normal Mode | Abnormal Mode |
|----------------|-------------|---------------|
| Target Region (Error Threshold) | First Region(a1), Second Region(b1) | First Region(a2>a1), Second Region(b2>b1) |

STORAGE DEVICE AND OPERATING METHOD THEREOF

CROSS-REFERENCE TO RELATED APPLICATION

The present application claims priority under 35 U.S.C. § 119 (a) to Korean patent application number 10-2023-0087126 filed on Jul. 5, 2023, the entire disclosure of which is incorporated by reference herein.

BACKGROUND

1. Field of Invention

Embodiments of the present disclosure generally relate to an electronic device, and more particularly, to a storage device and an operating method thereof.

2. Description of Related Art

A storage device is a device which stores data according to a request from a host device such as a computer or a smart phone. The storage device may include a memory device for storing data and a memory controller for controlling the memory device. The memory device may be a volatile memory device or a nonvolatile memory device.

The memory controller may perform a background operation on the memory device to improve the reliability of the memory device and/or to increase the lifetime of the memory device. For example, the memory controller may perform a background media scan on memory blocks included in the memory device during a background period in which the memory device is in an idle state. The background media scan may be an operation of copying data stored in one memory block to another memory block when an error bit number of data read from a page included in the memory block exceeds an error threshold value. The memory controller may reduce error occurrence according to retention occurring when a memory block is not used during a certain period, through the background media scan.

SUMMARY

Embodiments of the present disclosure provide a storage device capable of controlling (i.e., restraining) a background media scan in an abnormal mode in which the temperature of a memory device is out of a set range, and an operating method of the storage device.

In accordance with one aspect of the present disclosure, there is provided a storage device including: a memory device including a first region including a memory block storing n bit(s) per memory cell, where n is a natural number of 1 or more, and a second region including a memory block storing m bits per memory cell, where m is a natural number greater than m, and a memory controller configured to set an operation mode of a background media scan to one of a normal mode in which a temperature of the memory device is within a set range and an abnormal mode in which the temperature of the memory device is out of the set range according to whether the operation mode of the background media scan is the normal mode or the abnormal mode, and perform the background media scan on at least one of the first region and the second region, which are included in the memory device, based on operation condition information of the background media scan, which respectively correspond to the normal mode and the abnormal mode.

In accordance with another aspect of the present disclosure, there is provided a memory controller including: a volatile memory configured to store operation condition information of a background media scan, which respectively correspond to a normal mode in which a temperature of a memory device is within a set range and an abnormal mode in which the temperature of the memory device is out of the set range; and a processor configured to generate temperature information representing whether an operation mode of the background media scan is the normal mode in which the temperature of the memory device is within the set range, set the operation mode of the background media scan to one of the normal mode and the abnormal mode based on the temperature information, and perform the background media scan on at least one of a first region and a second region which are included in the memory device, based on the operation condition information, wherein the first region includes a memory block storing n bit(s) per memory cell, where n is a natural number of 1 or more, and the second region includes a memory block storing m bits per memory cell, where m is a natural number greater than n.

In accordance with still another aspect of the present disclosure, there is provided a method of operating a memory controller, the method including: generating temperature information representing whether an operation mode of a background media scan is a normal mode in which a temperature of a memory device is within a set range or an abnormal mode in which the temperature of the memory device is out of the set range; setting the operation mode of the background media scan to one of the normal mode and the abnormal mode, based on the temperature information; and performing the background media scan on at least one of a first region and a second region which are included in the memory device, based on operation condition information of the background media scan, which respectively correspond to the normal mode and the abnormal mode, wherein the first region includes a memory block storing n bit(s) per memory cell, where n is a natural number of 1 or more, and the second region includes a memory block storing m bit(s) per memory cell, where m is a natural number greater than n.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

These and other features and advantages of the invention will become apparent from the detailed description of embodiments of the present disclosure and the following figures.

Figure 1:
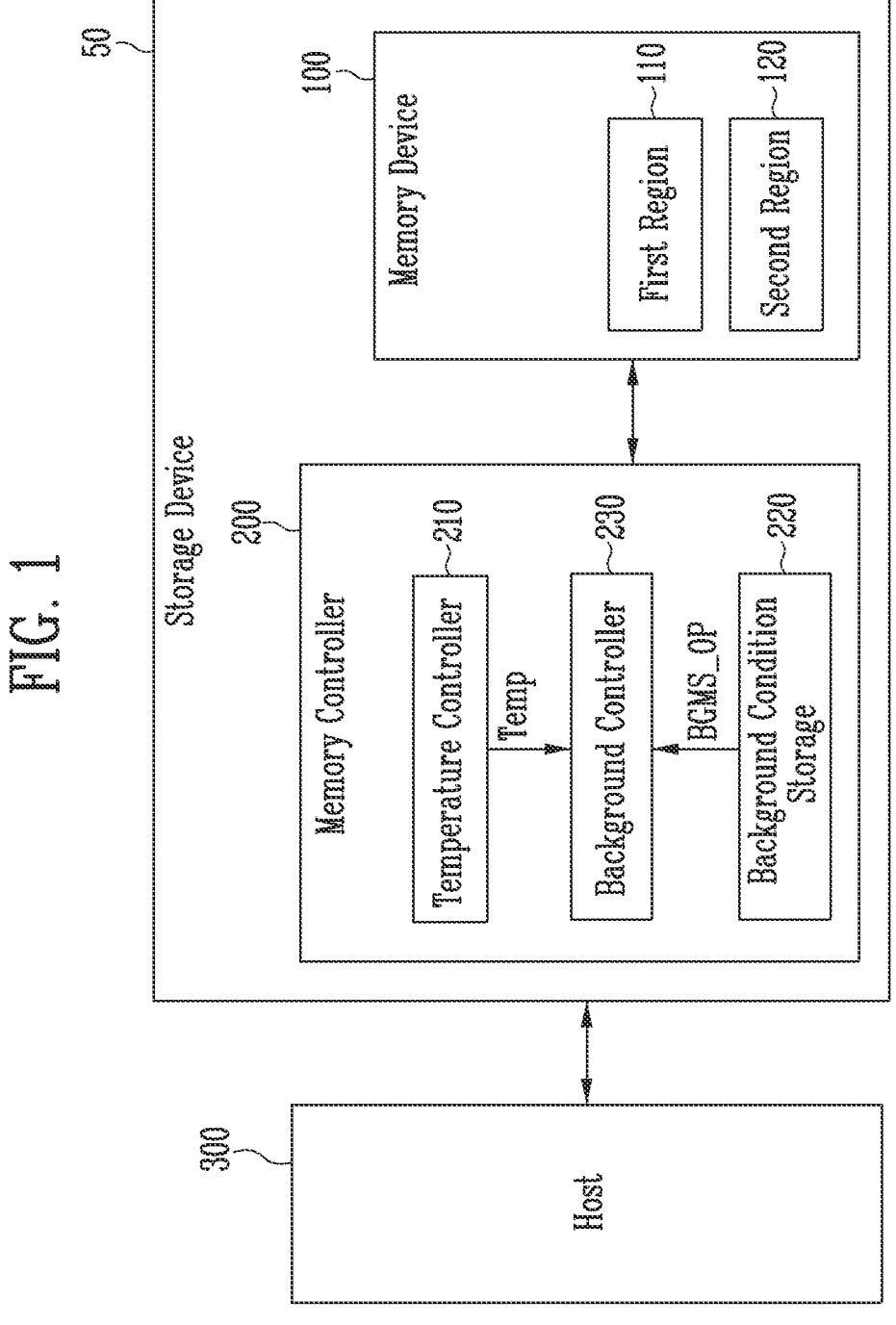

FIG. 1 is a diagram illustrating a storage device in accordance with an embodiment of the present disclosure.

Figures 2, 3, 4:
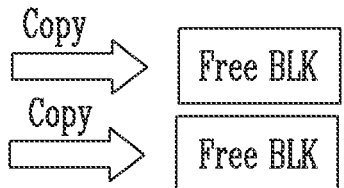

FIG. 2 is a diagram illustrating a background media scan in accordance with an embodiment of the present disclosure.

FIG. 3 is a diagram illustrating operation condition information of the background media scan in accordance with an embodiment of the present disclosure.

FIG. 4 is a diagram illustrating operation condition information of the background media scan in accordance with an embodiment of the present disclosure.

Figure 5:
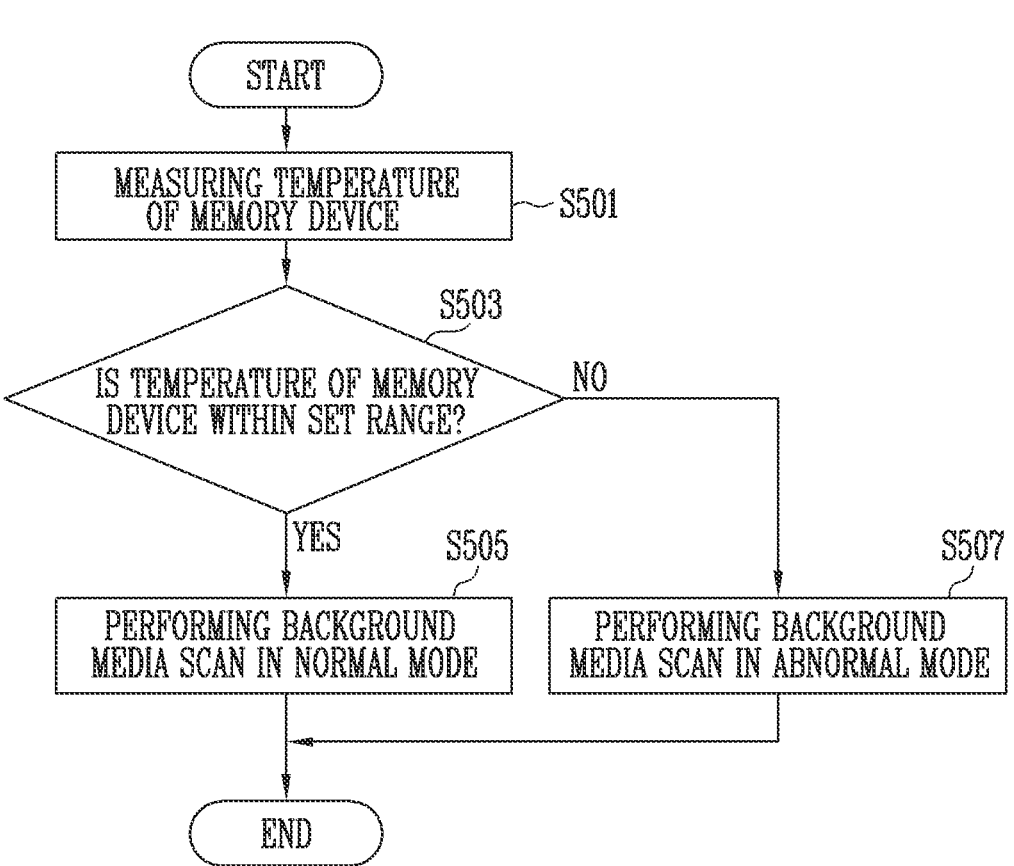

FIG. 5 is a flowchart illustrating an operation of a memory controller in accordance with an embodiment of the present disclosure.

Figure 6:
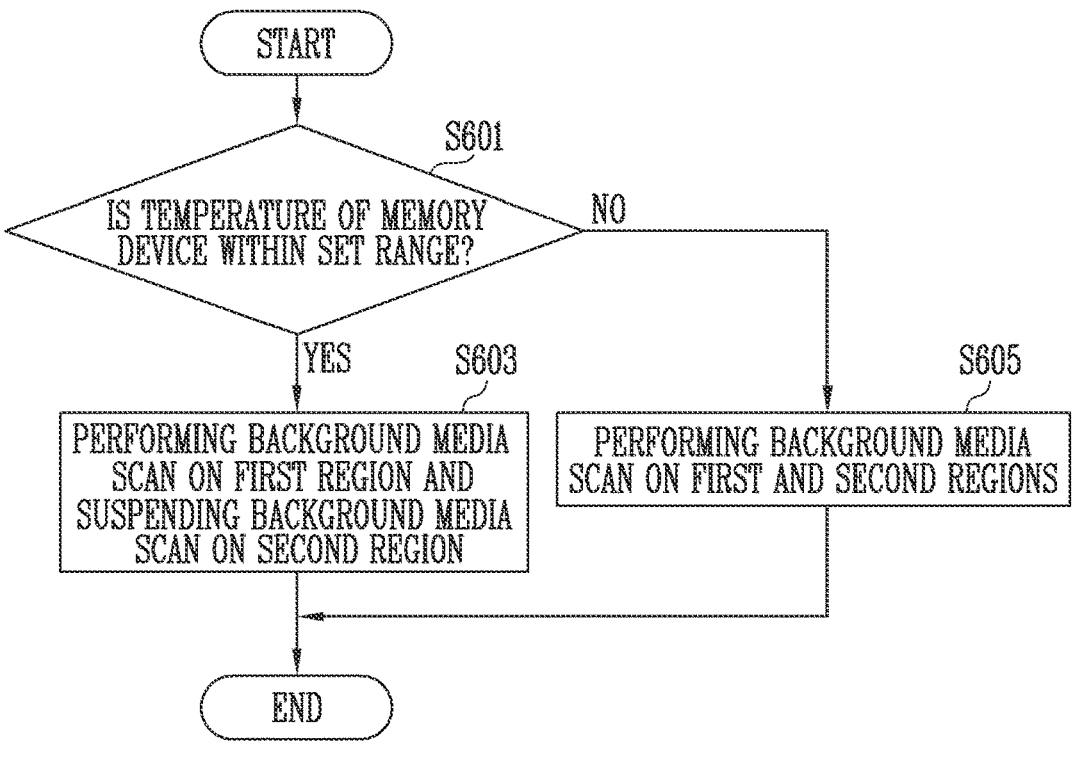

FIG. 6 is a flowchart illustrating an operation of the memory controller in accordance with an embodiment of the present disclosure.

Figure 7:
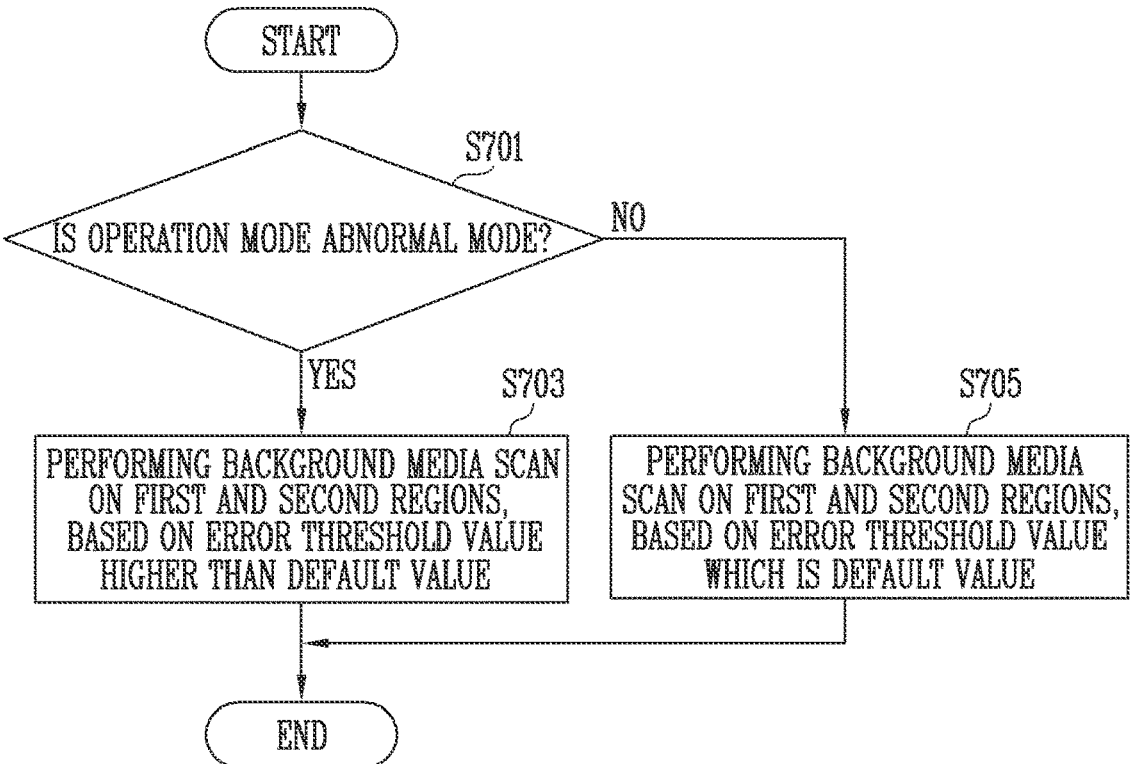

FIG. 7 is a flowchart illustrating an operation of the memory controller in accordance with an embodiment of the present disclosure.

Figure 8:
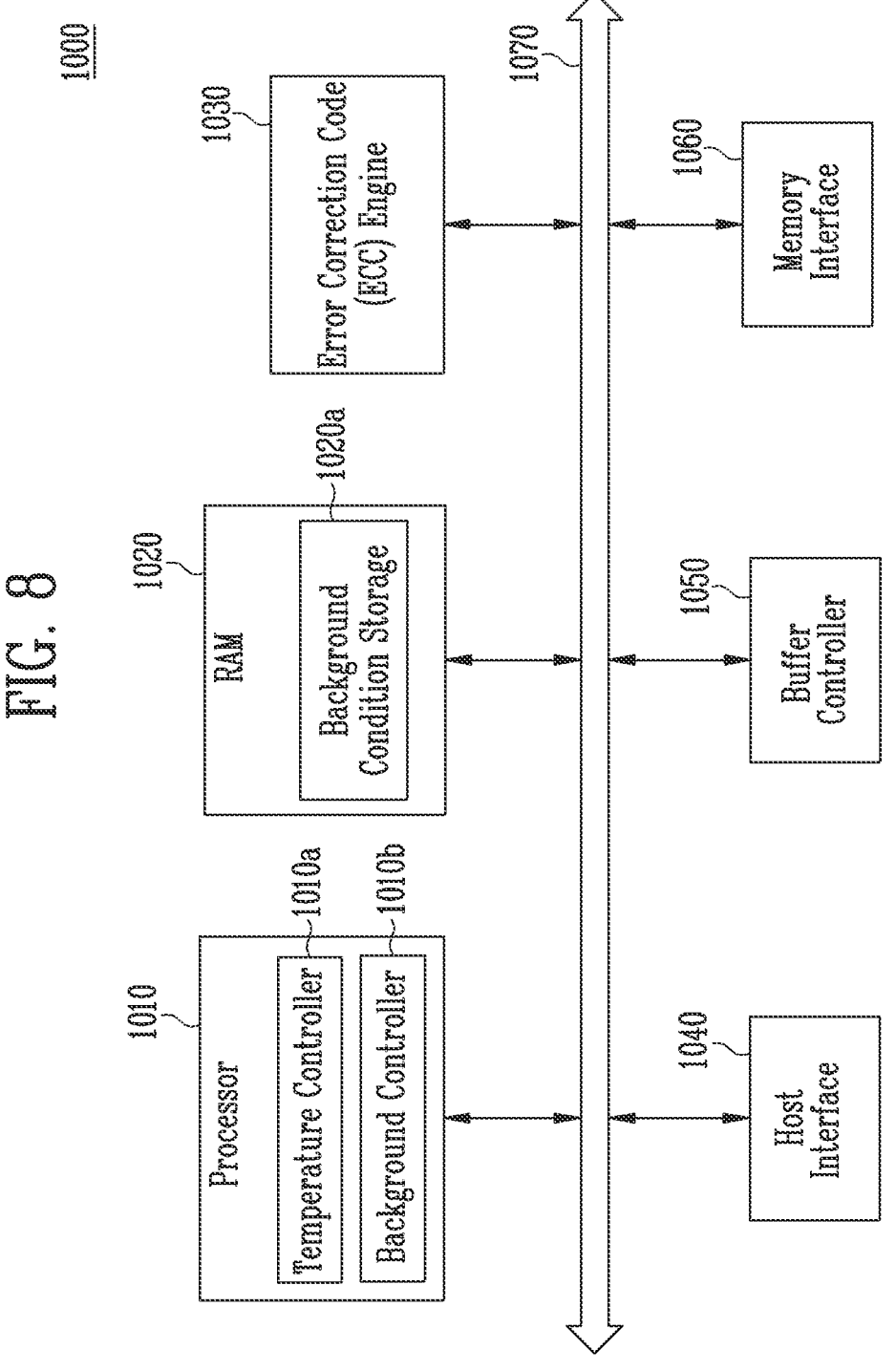

FIG. 8 is a diagram illustrating another embodiment of the memory controller shown in FIG. 1.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

FIG. 1 is a diagram illustrating a storage device 50 in accordance with an embodiment of the present disclosure.

Referring to FIG. 1, the storage device 50 may include a memory device 100 and a memory controller 200 for controlling an operation of the memory device 100. The storage device 50 may be a device for storing data under the control of a host 300 (i.e., an external device), such as a mobile phone, a smart phone, an MP3 player, a laptop computer, a desktop computer, a game console, a TV, a tablet PC, or an in-vehicle infotainment.

The storage device 50 may be manufactured as any of various types of storage devices according to a communication scheme with the host 300. For example, the storage device 50 may be configured with any of various types of storage devices, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) memory module, a Universal Flash Storage (UFS) device, a personal computer memory card international association (PCMCIA) card type memory module, a peripheral component interconnection (PCI) card type memory module, a PCI express (PCI-E) card type memory module, a Compact Flash (CF) card, a Smart Media Card (SMC), and a memory stick.

The storage device 50 may be manufactured as any of various package types, such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may operate under the control of the memory controller 200. The memory device 100 may include a plurality of memory blocks. A memory block may include a plurality of memory cells for storing data. Memory cells connected to the same word line among the plurality of memory cells may be referred to as one physical page.

In an embodiment, the memory device 100 may include a Random Access Memory (RAM), a Non-Volatile Memory (NVM), a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like.

The memory device 100 may receive a command and an address from the memory controller 200, and access a region selected by the address in a storage region. That is, the memory device 100 may perform an operation instructed by the command on the region selected by the address. For example, the memory device 100 may perform a write operation (i.e., program operation), a read operation, and an erase operation. In the program operation, the memory device 100 may program data in the region selected by the address. In the read operation, the memory device 100 may read data stored in the region selected by the address. In the erase operation, the memory device 100 may erase data stored in the region selected by the address.

In an embodiment, the memory device 100 may include a first region 110 and a second region 120. The first region 110 may include a memory block storing n bit(s) per memory cell, where n is a natural number of 1 or more, and the second region 120 may include a memory block storing m bits per memory cell, where m is a natural number greater than n.

For example, the first region 110 may include a Single Level Cell (SLC) block, and the second region 120 may include a Triple Level Cell (TLC) block.

The memory controller 200 may control operations of the storage device 50.

In an embodiment, the memory controller 200 may receive data and a logical address, which are input from the host 300, and translate the logical address into a physical address representing addresses of memory cells included in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a physical address, and data to the memory device 100. In the read operation, the memory controller 200 may provide a read command and a physical address to the memory device 100. In the erase operation, the memory controller 200 may provide an erase command and a physical address to the memory device 100.

In an embodiment, the memory controller 200 may include a temperature controller 210, a background condition storage 220, and a background controller 230.

The temperature controller 210 may measure a temperature of the memory device 100 and generate temperature information Temp. The temperature information Temp may indicate a normal mode when the temperature of the memory device 100 is within a set range, and indicate an abnormal mode when the temperature of the memory device 100 is out of the set range.

The background condition storage 220 may store operation condition information BGMS_OP of a background media scan corresponding to each of the normal mode and the abnormal mode. The operation condition information BGMS_OP will be described in detail in FIGS. 3 and 4.

The background controller 230 may set an operation mode of the background media scan to one of the normal mode and the abnormal mode, based on the temperature information Temp. The background controller 230 may perform the background media scan on at least one of the first region 110 and the second region 120, based on the operation condition information BGMS_OP.

In an embodiment, in the normal mode, the background controller 230 may perform the background media scan on the first region 110 and the second region 120. In the abnormal mode, the background controller 230 may perform the background media scan on the first region 110, and suspend the background media scan on the second region 120.

In an embodiment, in the normal mode, the background controller 230 may perform the background media scan on each of the first region 110 and the second region 120, based on an error threshold value having a default value. In the abnormal mode, the background controller 230 may perform the background media scan on each of the first region 110 and the second region 120, based on an error threshold value higher than the default value. The error threshold value of the first region 110 and the error threshold value of the second region 120 may be set differently from each other.

FIG. 2 is a diagram illustrating a background media scan in accordance with an embodiment of the present disclosure.

Referring to FIG. 2, the background media scan may be a background operation for reducing error occurrence according to retention occurring when a memory block is not used during a certain period.

In the background media scan, a selected page among a plurality of pages included in a memory block may be read during a background period in which the memory device is in an idle state. When the number of error bits included in data read from the selected page exceeds an error threshold value, data stored in the memory block may be copied to another memory block.

A position of the selected page may include one of a first page, a middle page, a last page, a random page, and a predetermined weak page among the plurality of pages included in the memory block. The weak page may be a page predetermined through a test performed during a manufacturing process.

Through the background media scan, data stored in a memory block having high error occurrence probability is copied to another memory block before an uncorrectable error occurs, so that the performance and reliability of the memory device can be improved.

In FIG. 2, the numbers of error bits detected in data read from pages included in a plurality of memory blocks BLK1 to BLK4 may be 5, 10, 30, and 20, respectively. A default value of an error threshold value, which is a trigger condition of the background media scan, may be 15. Therefore, data stored in third and fourth memory blocks BLK3 and BLK4, each of which the number of error bits exceeds the error threshold value, may be copied to another memory block.

In an embodiment, when the error threshold value is set to 25 higher than the default value 15, the background media scan may be performed on only the third memory block BLK3. That is, when the error threshold value becomes high, the number of targets of the background media scan is decreased, and therefore, the performance frequency of the background media scan may be decreased.

FIG. 3 is a diagram illustrating operation condition information BGMS_OP1 of the background media scan in accordance with an embodiment of the present disclosure.

Referring to FIG. 3, the background media scan on a first region and a second region may be allowed in a normal mode. In an abnormal mode, the background media scan on the first region may be allowed, and the background media scan on the second region may be inhibited (or suspended).

The normal mode may represent that the temperature of the memory device is within a set range, and the abnormal mode may represent that the temperature of the memory device is out of the set range. The first region may include a memory block storing n bit(s) per memory cell, where n is a natural number of 1 or more, and the second region may include a memory block storing m bits per memory cell, where m is a natural number greater than n.

In the case of the abnormal mode, the background media scan on the second region is suspended, so that the background media scan can be prevented from being unnecessarily performed while neglecting a high error occurrence rate which may temporarily occur at an abnormal temperature.

FIG. 4 is a diagram illustrating operation condition information BGMS_OP2 of the background media scan in accordance with an embodiment of the present disclosure.

Referring to FIG. 4, the background media scan on a first region and a second region may be allowed in each of a normal mode and an abnormal mode. Descriptions of the normal mode, the abnormal mode, the first region, and the second region may be the same as described with reference to FIG. 3.

In the case of the normal mode, an error threshold value corresponding to the first region may be set to a1, and an error threshold value corresponding to the second region may be set to b1. Each of a1 and b1 may be a default value of an error threshold value corresponding to each region. In the case of the abnormal mode, the error threshold value corresponding to the first region may be set to a2 higher than a1, and the error threshold value corresponding to the second region may be set to b2 higher than b1.

In the case of the abnormal mode, the error threshold value corresponding to each region is set high as compared with the normal mode, so that the performance frequency of the background media scan can be decreased. Thus, the background media scan can be prevented from being unnecessarily performed while neglecting a high error occurrence rate which may temporarily occur at an abnormal temperature.

FIG. 5 is a flowchart illustrating an operation of the memory controller 200 in accordance with an embodiment of the present disclosure.

Referring to FIG. 5, in operation S501, the memory controller 200 may measure a temperature of the memory device 100.

In operation S503, the memory controller 200 may determine whether the temperature of the memory device 100 is within a set range. When the temperature of the memory device 100 is within the set range (i.e., in case of YES in the operation S503), the memory controller 200 may proceed to operation S505. When the temperature of the memory device 100 is out of the set range (i.e., in case of NO in the operation S503), the memory controller 200 may proceed to operation S507.

In the operation S505, the memory controller 200 may perform a background media scan on the memory device 100 in a normal mode.

In the operation S507, the memory controller 200 may perform the background media scan on the memory device 100 in an abnormal mode. In the case of the abnormal mode, as compared with the normal mode, the background media scan on a partial storage region may be limited, or an error threshold value as a trigger condition of the background media scan may be set high. Accordingly, the background media scan can be prevented from being unnecessarily performed while neglecting a high error occurrence rate which may temporarily occur at an abnormal temperature.

FIG. 6 is a flowchart illustrating an operation of the memory controller 200 in accordance with an embodiment of the present disclosure.

Referring to FIG. 6, in operation S601, the memory controller 200 may determine whether an operation mode of a background media scan is an abnormal mode. When the operation mode is the abnormal mode (i.e., in case of YES in the operation S601), the memory controller 200 may proceed to operation S603. When the operation mode is a normal mode (i.e., in case of NO in the operation S601), the memory controller 200 may proceed to operation S605.

In the operation S603, the memory controller 200 may perform the background media scan on a first region, and suspend the background media scan on a second region.

In the operation S605, the memory controller 200 may perform the background media scan on the first region and the second region.

In an embodiment, the first region may include a memory block storing n bit(s) per memory cell, where n is a natural number of 1 or more, and the second region may include a memory block storing m bits per memory cell, where m is a natural number greater than n.

In the case of the abnormal mode, the background media scan on the second region is suspended, so that the background media scan can be prevented from being unnecessarily performed while neglecting a high error occurrence rate which may temporarily occur at an abnormal temperature.

FIG. 7 is a flowchart illustrating an operation of the memory controller 200 in accordance with an embodiment of the present disclosure.

Referring to FIG. 7, in operation S701, the memory controller 200 may determine whether an operation mode of a background media scan is an abnormal mode. When the operation mode is the abnormal mode (i.e., in case of YES in the operation S701), the memory controller 200 may proceed to operation S703. When the operation mode is a normal mode (i.e., in case of NO in the operation S701), the memory controller 200 may proceed to operation S705.

In the operation S703, the memory controller 200 may perform the background media scan on a first region and a second region, based on an error threshold value higher than a default value.

In the operation S705, the memory controller 200 may perform the background media scan on the first region and the second region, based on an error threshold value which is the default value.

In an embodiment, the first region may include a memory block storing n bit(s) per memory cell, where n is a natural number of 1 or more, and the second region may include a memory block storing m bits per memory cell, where m is a natural number greater than n.

In the case of the abnormal mode, the background media scan is performed based on an error threshold value higher than an error threshold value in the normal mode, and thus the performance frequency of the background media scan can be decreased. Accordingly, the background media scan can be prevented from being unnecessarily performed while neglecting a high error occurrence rate which may temporarily occur at an abnormal temperature.

FIG. 8 is a diagram illustrating another embodiment of the memory controller 200 shown in FIG. 1.

Referring to FIG. 8, a memory controller 1000 may be connected to a host and a memory device. The memory controller 1000 may access the memory device in response to a request from the host.

The memory controller 1000 shown in FIG. 8 may be the memory controller 200 shown in FIG. 1.

The memory controller 1000 may control write, read, erase, and background operations of the memory device. The memory controller 1000 may provide an interface between the memory device and the host. The memory controller 1000 may driver firmware for controlling the memory device.

The memory controller 1000 may include a processor 1010, a RAM 1020, an Error Correction Code (ECC) engine 1030, a host interface 1040, a buffer controller 1050, a memory interface 1060, and a bus 1070.

The bus 1070 may serve as a communication channel between components included in the memory controller 1000.

The processor 1010 may control operations of the memory controller 1000, and perform a logical operation. The processor 1010 may communicate with the host through the host interface 1040, and communicate with the memory device through the memory interface 1060. Also, the processor 1010 may communicate with the RAM 1020 through the buffer controller 1050. The processor 1010 may control an operation of the storage device, using the RAM 1020 as a working memory, a cache memory, or a buffer memory.

The processor 1010 may translate a Logical Block Address (LBA) provided by the host into a Physical Block Address (PBA). A Flash Translation Layer (FTL) may receive an LBA, using a mapping table, to translate the LBA into a PBA.

When the memory device is a nonvolatile memory, the processor 1010 may randomize data received from the host. The randomized data may be provided to the memory device to be programmed.

The processor 1010 may derandomize data received from the memory device in a read operation. For example, the processor 1010 may derandomize data received from the memory device, using a derandomizing seed, and output the derandomized data to the host.

In an embodiment, the processor 1010 may perform randomizing and derandomizing by driving software or firmware.

In an embodiment, the processor 1010 may include a temperature controller 1010a and a background controller 1010b as described with reference to FIG. 1. The temperature controller 1010a may generate temperature information representing whether an operation mode of a background media scan is a normal mode in which a temperature of the memory device is within a set range. The background controller 1010b may set the operation mode of the background media scan to one of the normal mode or the abnormal mode, based on the temperature information, and perform the background media scan on at least one of a first region and a second region, which are included in the memory device, based on operation condition information.

The RAM 1020 is a volatile memory, and may be used as a working memory, a cache memory, or a buffer memory of the processor 1010. The RAM 1020 may store codes and commands, which are executed by the processor 1010. The RAM 1020 may store data processed by the processor 1010. The RAM 1020 may include a Static RAM (SRAM) or a Dynamic RAM (DRAM).

In an embodiment, the RAM 1020 may include a background condition storage 1020*a* as described with reference to FIG. 1. The background condition storage 1020*a* may store operation condition information of the background media scan, which respectively correspond to the normal mode in which the temperature of the memory device is within the set range and the abnormal mode in which the temperature of the memory device is out of the set range.

The ECC engine 1030 may perform error correction. The ECC engine 1030 may perform Error Correction Code (ECC) encoding on data to be written in the memory device through the memory interface 1060. The ECC encoded data may be transferred to the memory device through the memory interface 1060. The ECC engine 1030 may perform ECC decoding on data received from the memory device through the memory interface 1060. The ECC engine 1030 may be included in the memory interface 1060 as a component of the memory interface 1060.

The host interface 1040 may communicate with the host under the control of the processor 1010. The host interface 1040 may communicate with the host, using at least one of various communication standards or protocols, such as a Universal Serial bus (USB), a Serial AT Attachment (SATA), a Serial Attached SCSI (SAS), a Small Computer System Interface (SCSI), a Peripheral Component Interconnection (PCI), a PCI express (PCIe), a NonVolatile Memory Express (NVMe), and a Universal Flash Storage (UFS).

The buffer controller 1050 may control the RAM 1020 under the control of the processor 1010. The memory interface 1060 may communicate a command, an address, and data with the memory device through the channel under the control of the processor 1010.

The processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

The bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be connected to the host interface 1040, the buffer controller 1050, the ECC engine 1030, and the memory interface 1060. The control bus may be connected to the host interface 1040, the processor 1010, the buffer controller 1050, and the memory interface 1060.

In accordance with various embodiments of the present disclosure, there is provided a storage device for controlling (i.e., restraining) a background media scan in an abnormal mode in which the temperature of a memory device is out of a set range, and an operating method of the storage device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A storage device comprising:
a memory device including a first region including a memory block storing n bit(s) per memory cell and a second region including a memory block storing m bits per memory cell, where n is a natural number of 1 or more and m is a natural number greater than n; and
a memory controller configured to
set an operation mode of a background media scan to one of a first mode in which a temperature of the memory device is within a set range and a second mode in which the temperature of the memory device is out of the set range, and
perform the background media scan on at least one of the first region and the second region, based on operation condition information of the background media scan corresponding to one of the first mode and the second mode,
wherein, in the second mode, the memory controller is configured to perform the background media scan on the first region and to suspend the background media scan on the second region.

2. The storage device of claim 1, wherein the memory controller is configured to:
read a selected page among a plurality of pages included in one memory block during a background period in which the memory device is in an idle state; and
copy data stored in the one memory block to another memory block when an error bit number included in data read from the selected page exceeds an error threshold value.

3. The storage device of claim 2, wherein the selected page includes one of a first page, a middle page, a last page, a random page, and a predetermined weak page among the plurality of pages.

4. The storage device of claim 1, wherein, in the second mode, the memory controller is configured to perform the background media scan on the first region and the second region, based on an error threshold value higher than an error threshold value in the first mode.

5. A memory controller comprising:

a volatile memory configured to store operation condition information of a background media scan, which correspond to one of a first mode in which a temperature of a memory device is within a set range and a second mode in which the temperature of the memory device is out of the set range; and a processor configured to generate temperature information representing whether an operation mode of the background media scan is the first mode in which the temperature of the memory device is within the set range, set the operation mode of the background media scan to one of the first mode and the second mode, based on the temperature information, and perform the background media scan on at least one of a first region and a second region, which are included in the memory device, based on the operation condition information, wherein the first region includes a memory block storing n bit(s) per memory cell, where n is a natural number of 1 or more, and the second region includes a memory block storing m bits per memory cell, where m is a natural number greater than n, and wherein, in the second mode, the processor is configured to perform the background media scan on the first region and to suspend the background media scan on the second region.

6. The memory controller of claim 5, wherein the processor is configured to:

read a selected page among a plurality of pages included in one memory block during a background period in which the memory device is in an idle state; and copy data stored in the one memory block to another memory block when an error bit number included in data read from the selected page exceeds an error threshold value.

7. The memory controller of claim 6, wherein the selected page includes one of a first page, a middle page, a last page, a random page, and a predetermined weak page among the plurality of pages.

8. The memory controller of claim 5, wherein the volatile memory is configured to store the operation condition information in which:

in the first mode, the background media scan on the first region and the second region is allowed; and in the second mode, the background media scan on the first region is allowed and the background media scan on the second region is inhibited.

9. The memory controller of claim 5, wherein the volatile memory is configured to store the operation condition information in which:

in the first mode, an error threshold value as a trigger condition of the background media scan on each of the first region and the second region is set to a default value; and in the second mode, the error threshold value of each of the first region and the second region is set higher than the default value.

10. The memory controller of claim 5, wherein, in the second mode, the processor is configured to perform the background media scan on the first region and the second region, based on an error threshold value higher than an error threshold value in the first mode.

11. A method of operating a memory controller, the method comprising:

generating temperature information representing whether an operation mode of a background media scan is a first mode in which a temperature of a memory device is within a set range, or a second mode in which the temperature of the memory device is out of the set range;

setting the operation mode of the background media scan to one of the first mode and the second mode, based on the temperature information; and performing the background media scan on at least one of a first region and a second region, which are included in the memory device, based on operation condition information of the background media scan, which correspond to one of the first mode and the second mode, wherein the first region includes a memory block storing n bit(s) per memory cell, where n is a natural number of 1 or more, and the second region includes a memory block storing m bit(s) per memory cell, where n is a natural number greater than n, and wherein performing of the background media scan comprises, in the second mode, performing the background media scan on the first region and suspending the background media scan on the second region.

12. The method of claim 11, further comprising:

reading a selected page among a plurality of pages included in one memory block during a background period in which the memory device is in an idle state; and copying data stored in the one memory block to another memory block when an error bit number included in data read from the selected page exceeds an error threshold value.

13. The method of claim 11, wherein the selected page includes one of a first page, a middle page, a last page, a random page, and a predetermined weak page among the plurality of pages.

14. The method of claim 11, further comprising:

performing, in the second mode, the background media scan on the first region and the second region, based on an error threshold value higher than an error threshold value in the first mode.

* * * * *